A. MINNICK.
DEMOUNTABLE RIM.
APPLICATION FILED JAN. 22, 1919.
1,390,576.
Patented Sept. 13, 1921.
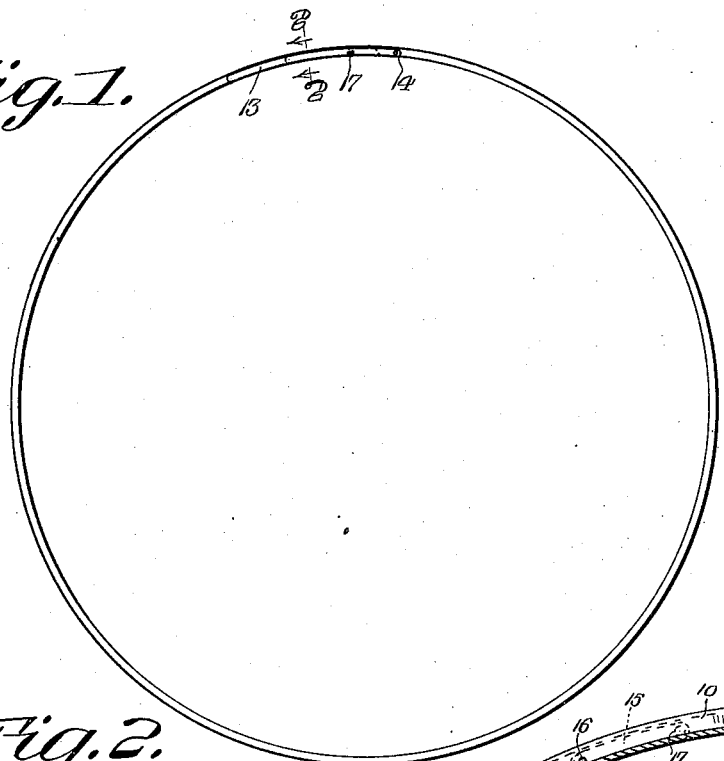
Fig. 1.
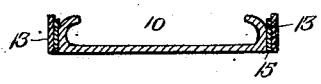
Fig. 2.
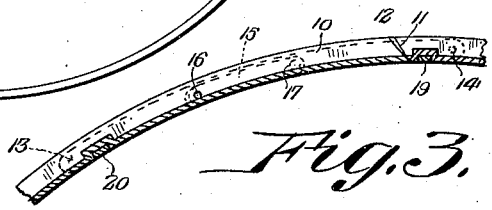
Fig. 3.
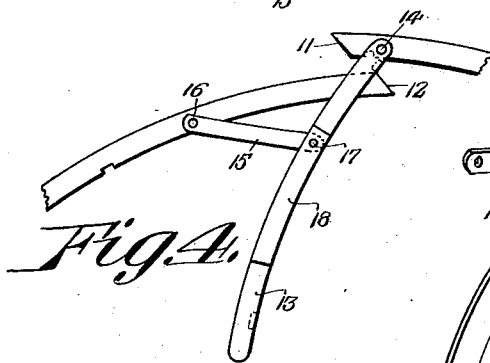
Fig. 4.
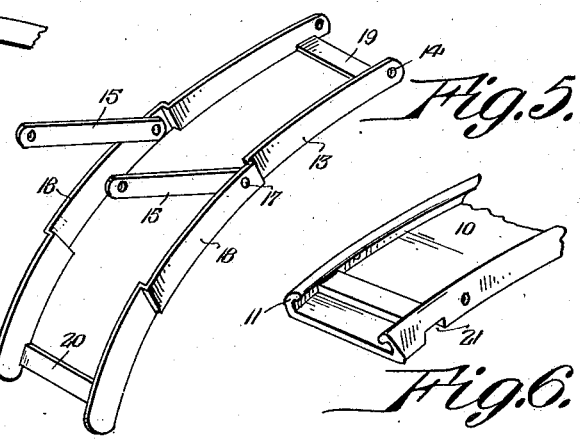
Fig. 5.
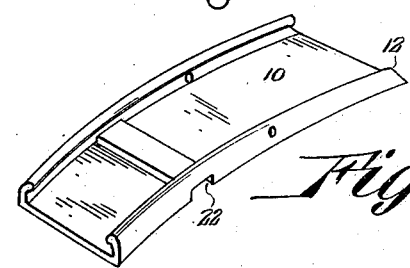
Fig. 7.
Fig. 6.
Inventor
Alfred Minnick,
By
Attorney

UNITED STATES PATENT OFFICE.

ALFRED MINNICK, OF NEWARK, NEW JERSEY, ASSIGNOR TO M-V ALL WEATHER TRAIN CONTROLLER COMPANY, OF WILMINGTON, DELAWARE, A CORPORATION OF DELAWARE.

DEMOUNTABLE RIM.

1,390,576.

Specification of Letters Patent. Patented Sept. 13, 1921.

Application filed January 22, 1919. Serial No. 272,551.

*To all whom it may concern:*

Be it known that I, ALFRED MINNICK, a citizen of the United States, and resident of Newark, county of Essex, and State of New Jersey, have invented a new and useful Improvement in Demountable Rims, of which the following is a specification.

The object of the invention is to provide a demountable rim for the the wheels of automobiles, motorcycles and similar vehicles for the purpose of facilitating the replacement of tires, the rim being of such construction that it may readily be engaged with and disengaged from the tire casing or shoe, and slipped on or off the wheel without the use of tools or loss of time, and if applied to an extra tire will retain its operative tire-holding condition indefinitely notwithstanding the vibration and jars incident to travel.

In the drawing, wherein a preferred embodiment of the invention is illustrated,

Figure 1 is a side view of the rim;

Fig. 2 is a transverse section on the line 2—2 of Fig. 1;

Fig. 3 is a detail longitudinal section adjacent to the joint, closed.

Fig. 4 is a detail side view of the joint as seen when open.

Fig. 5 is a perspective view of the toggle lever, detached.

Fig. 6 is a similar view of one end of the rim.

Fig. 7 is a similar view of the other end of the rim.

The invention consists essentially in splitting or jointing the rim 10 which may be of the flanged or clencher type shown or of any other of the forms adaptable to the various tires used on auto and similar vehicle wheels, the joint producing abutting or substantially contacting ends or terminals 11 and 12 which may be beveled as shown and are adapted to be relatively deflected or moved out of alinement to permit the rim to collapse, and a toggle lever, as shown in detail in Fig. 5, for expanding the rim and re-alining the terminals and locking them against displacement by the contractive force of the encircling tire.

As illustrated, the toggle lever, which may be utilized to effect the collapsing as well as the expending of the rim, comprises an operating member 13 fulcrumed at 14 to one rim terminal and a link member 15 fulcrumed at 16 to the other rim terminal and pivoted to the operating member at 17. The operating member may, if found desirable, be provided with an offset 18 to form a housing for the link member, and as the operating member is preferably composed of parallel side arms, to operate wholly outside of but in contact with the opposite edges of the rim and are connected by cross-bars 19 and 20, seats 21 and 22 may be formed in the rim, for the reception respectively of said bars to constitute an auxiliary locking means to prevent accidental collapse of the rim and serve as a reinforcement or stiffening agency for the joint. The link member is correspondingly duplicated or formed of coöperating elements as indicated.

The primary locking agency for the joint, to maintain the rim terminals in alinement so as to resist the tendency of the contractile force exerted by a tire to collapse the rim, resides in the toggle by reason of the location of the pivot point 17 outside of a line connecting the pivot points 14 and 16, to thus constitute an eccentric lock, the outward movement of the free end of the lever 13 being limited as by the engagement of the cross-bar 20 with the rim or the seat 22 therein.

However, the breaking of the toggle is readily effected to disaline the rim terminals and permit the collapse necessary to facilitate the removal of the tire, and the toggle affords a positive leverage to forcibly effect such collapse, while also constituting means, as by the application of foot pressure upon the operating member, for expanding the rim against the resistance of the tire after the latter has been seated.

It will be obvious that a rim of the ordinary construction may readily be converted into a collapsible rim, merely by cutting or splitting the same at a convenient point to form terminals 11, 12 and applying the toggle lock, which may be separately produced for adaptation to rims already in use. A special construction of rim is not required in order to obtain the advantages of ready seating and unseating of tires, as above set forth, and in the event that the extra tire is carried on an extra demountable rim, the proper condition of the former, when required, is assured by the fact that accidental collapse of the rim by the vibration or jarring of the vehicle is effectually prevented.

What is claimed is:—

1. A demountable wheel-rim consisting of a split ring having abutting terminals adapted for relative deflection, and a toggle lever having its pivotally connected members respectively pivoted to said terminals and occupying a position between the lines of the inner and outer peripheries of the rim when expanded.

2. A demountable wheel-rim consisting of a split ring having an unobstructed inner periphery and abutting terminals adapted for relative deflection in the plane of the ring to permit the contraction thereof, and a toggle lever having operating and link members respectively pivoted to said terminals for swinging movement parallel with the plane of the rim and arranged between the lines of the inner and outer peripheries of the rim when expanded.

3. A demountable wheel-rim consisting of a split ring having abutting terminals adapted for relative deflection and a toggle lever having pivotally connected operating and link members respectively connected with said terminals and adapted for normal arrangement between the lines of the inner and outer peripheries of the rim, the operating member and rim terminals having interlocking elements for engagement when the terminals are in abutting relation.

4. A demountable wheel-rim consisting of a split ring having terminals movable relatively to effect the contraction and expansion of the rim, and a toggle having a parallel armed operating member pivotally mounted upon the edges of one terminal and having an intermediate link connected with the other terminal, the former having a lateral offset for nesting the latter, and the operating member being arranged between the inner and outer peripheries of the rim.

In testimony whereof I affix my signature.

ALFRED MINNICK.

Witness:
H. M. Mayhew.